US011978375B2

(12) United States Patent
Kwak et al.

(10) Patent No.: US 11,978,375 B2
(45) Date of Patent: May 7, 2024

(54) DISPLAY CIRCUITS

(71) Applicant: Intel Corporation, Santa Clara, CA (US)

(72) Inventors: Dong Yeung Kwak, San Jose, CA (US); Ramon C. Cancel Olmo, Hillsboro, OR (US); Thomas A. Nugraha, Tokyo (JP); Jue Li, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/561,502

(22) Filed: Dec. 23, 2021

(65) Prior Publication Data

US 2022/0114939 A1 Apr. 14, 2022

Related U.S. Application Data

(63) Continuation of application No. 16/643,712, filed as application No. PCT/CN2017/105242 on Oct. 3, 2017, now Pat. No. 11,250,752.

(51) Int. Cl.
*G09G 3/20* (2006.01)

(52) U.S. Cl.
CPC .......... *G09G 3/20* (2013.01); *G09G 2300/08* (2013.01); *G09G 2310/0275* (2013.01); *G09G 2310/0297* (2013.01); *G09G 2310/08* (2013.01); *G09G 2330/021* (2013.01)

(58) Field of Classification Search
CPC ................ G09G 3/20; G09G 2300/08; G09G 2310/0275; G09G 2310/0297; G09G 2310/08; G09G 2330/021; G09G 3/3688; G09G 2300/0408; G09G 2300/0426; G09G 3/3648; G09G 3/3225
See application file for complete search history.

(56) References Cited

U.S. PATENT DOCUMENTS

| | | | |
|---|---|---|---|
| 11,250,752 B2 | 2/2022 | Kwak et al. | |
| 2012/0223927 A1 | 9/2012 | Hsieh et al. | |
| 2014/0015821 A1* | 1/2014 | Hwang | G09G 3/20 345/211 |
| 2014/0307004 A1 | 10/2014 | Roh | |
| 2015/0248149 A1 | 9/2015 | Yamazaki et al. | |

(Continued)

FOREIGN PATENT DOCUMENTS

| | | |
|---|---|---|
| CN | 104112423 A | 10/2014 |
| CN | 105469752 A | 4/2016 |
| WO | 2019068213 A1 | 4/2019 |

OTHER PUBLICATIONS

International Searching Authority, "Written Opinion," dated Jun. 29, 2018 in connection with International Patent Application No. PCT/CN2017/105242, 3 pages.

(Continued)

*Primary Examiner* — Andrew Sasinowski
(74) *Attorney, Agent, or Firm* — Hanley, Flight & Zimmerman, LLC

(57) ABSTRACT

A disclosed example includes a plurality of display pixels; timing controller circuitry; driver circuitry on a same integrated circuit as the timing controller circuitry, the driver circuitry to drive the display pixels; and de-multiplexer circuitry to de-multiplex pixel data to send to the plurality of display pixels.

25 Claims, 12 Drawing Sheets

(56) References Cited

U.S. PATENT DOCUMENTS

| | | | | |
|---|---|---|---|---|
| 2016/0210919 | A1* | 7/2016 | Nakanishi | G09G 3/3648 |
| 2017/0017325 | A1 | 1/2017 | Tsai et al. | |
| 2017/0193918 | A1* | 7/2017 | Bae | G09G 3/3291 |
| 2018/0053475 | A1* | 2/2018 | Takahashi | G09G 3/3607 |
| 2018/0190678 | A1 | 7/2018 | Ahmed et al. | |
| 2018/0197465 | A1 | 7/2018 | Roh | |
| 2018/0286315 | A1 | 10/2018 | Zhang et al. | |
| 2019/0043451 | A1 | 2/2019 | Ansari et al. | |
| 2019/0244576 | A1 | 8/2019 | Kwak et al. | |
| 2020/0020296 | A1* | 1/2020 | Kim | G09G 3/3696 |

OTHER PUBLICATIONS

Zhang, Zhengyou "A Flexible New Technique for Camera Calibration"; Published in: IEEE Transactions on Pattern Analysis and Machine Intelligence ( vol. 22 , Issue: 11 , Nov. 2000 ), 5 pages.
Segal, Aleksandr, et al. "Generalized-ICP", Conference: Robotics: Science and Systems V, University of Washington, Seattle, USA, Jun. 28-Jul. 1, 2009, 8 Pages.
International Searching Authority, "International Search Report," dated Jun. 29, 2018 in connection with International Patent Application No. PCT/CN2017/105242, 2 pages.
International Searching Authority, "International Preliminary Report on Patentability," dated Apr. 8, 2020 in connection with International Patent Application No. PCT/CN2017/105242, 4 pages.
United States Patent and Trademark Office, "Non Final Office Action," issued in connection with U.S. Appl. No. 16/643,712, dated Jun. 4, 2021, 8 pages.
United States Patent and Trademark Office, "Notice of Allowance and Fee(s) Due," issued in connection with U.S. Appl. No. 16/643,712, dated Oct. 1, 2021, 8 pages.
PCMag Encyclopedia, "Definition of integrated circuit," retrieved from the Internet at https://www.pcmag.com/encyclopedia/term/integrated-circuit on Mar. 29, 2023, 5 pages.
Saint et al., "integrated circuit," Britannica, retrieved from the Internet at https://www.britannica.com/technology/integrated-circuit on Mar. 29, 2023, last updated Mar. 20, 2023, 13 pages.
Parade in the News, "Parade Teams with Samsung to Develop First eDP Tcon for AMOLED Panels," Apr. 21, 2016, retrieved on Oct. 25, 2023 from <https://www.paradetech.com/parade-teams-with-samsung-to-develop-first-edp-tcon-for-amoled-panels/>, 3 pages.
Parade in the News, "Parade's PS176 Display Port to HDMI 2.0 converter adopted by Samsung DeX," May 2, 2017, retrieved on Nov. 8, 2023 from <https://www.paradetech.com/parades-ps176-displayport-hdmi-2-0-converter-adopted-samsung-dex/>, 3 pages.
Parade, "PS176—DisplayPort™ to HDMI™ 2.0," retrieved from <https://paradetech.com/products/ps176/> on Oct. 25, 2023, 3 pages.
Matsuo et al., "Advantages of IGZO Oxide Semiconductor," SID Symposium Digest of Technical Papers, vol. 45, Issue 1, Jul. 7, 2014, 4 pages.
Yamazaki et al., "Future Possiblities of Crystalline Oxide Semiconductor, Especially C-Axis-Aligned Crystalline IGZO," SID Symposium Digest of Technical Papers, vol. 46, Issue 1, Jul. 29, 2015, 4 pages.
Parade, "Parade Introduces New eDP Tcon and Source Driver Chips for UHD Self-Refresh a-Si/Oxide/LTPS LCD Panels," Businesswire, Feb. 6, 2017, retrieved on Dec. 12, 2023 from: < https://www.businesswire.com/news/home/20170206005239/en/Parade-Introduces-New-eDP-Tcon-and- Source-Driver-Chips-for-UHD-Self-Refresh-a-SiOxideLTPS-LCD-Panels>, 2 pages.
Parade, "DP696—4 Lane 4K eDP PSR2 Tcon," Products, retrieved on Dec. 12, 2023 from: < https://www.paradetech.com/products/dp696/>, 3 pages.

* cited by examiner

100

200

300

400

500

600

700

800

900

1000

1100

1200

DISPLAY CIRCUITS

RELATED APPLICATION

This patent arises from a continuation of U.S. patent application Ser. No. 16/643,712, filed on Mar. 2, 2020, (now U.S. Pat. No. 11,250,752) which is a U.S. National Stage Application under 35 U.S.C. § 371 of International Patent Application No. PCT/CN2017/105242, filed on Oct. 3, 2017. U.S. patent application Ser. No. 16/643,712 and International Patent Application No. PCT/CN2017/105242 are hereby incorporated herein by reference in their entireties. Priority to U.S. patent application Ser. No. 16/643,712 and International Patent Application No. PCT/CN2017/105242 is hereby claimed.

TECHNICAL FIELD

This disclosure relates generally to display circuits.

BACKGROUND

Thin film transistors (TFTs) are a type of field effect transistor that can be made by depositing thin films over a supporting but non-conducting substrate. TFTs can be used in display panels (and/or display backplanes), in which a common substrate is glass. Displays have been transitioning from liquid crystal displays (LCDs) to organic light emitting diode (OLED) displays. A major driving force for this change has been use of oxide semiconductor materials as the active channel layer in thin film transistors (TFTs) of the display.

BRIEF DESCRIPTION OF THE DRAWINGS

The following detailed description may be better understood by referencing the accompanying drawings, which contain specific examples of numerous features of the disclosed subject matter.

In some cases, the same numbers are used throughout the disclosure and the figures to reference like components and features. In some cases, numbers in the 100 series refer to features originally found in FIG. 1; numbers in the 200 series refer to features originally found in FIG. 2; and so on.

DESCRIPTION OF THE EMBODIMENTS

Some embodiments relate to display circuits. Some embodiments relate to a display including a display timing controller (TCON) embedded driver circuit combined with a de-multiplexer (DEMUX) circuit.

It is desirable for a bezel of a display to be as thin as possible, and it is undesirable for a bezel of a display to be wide. Industry trend has been to minimize a width of display bezels as much as possible. For example, manufacturers of mobile devices have been working to make devices as small as possible, while maximizing display screen size and minimizing display bezel width within those small device size constraints. However, in some displays bezel width has necessarily increased due to, for example, a number of required traces (or paths).

Figure 1:
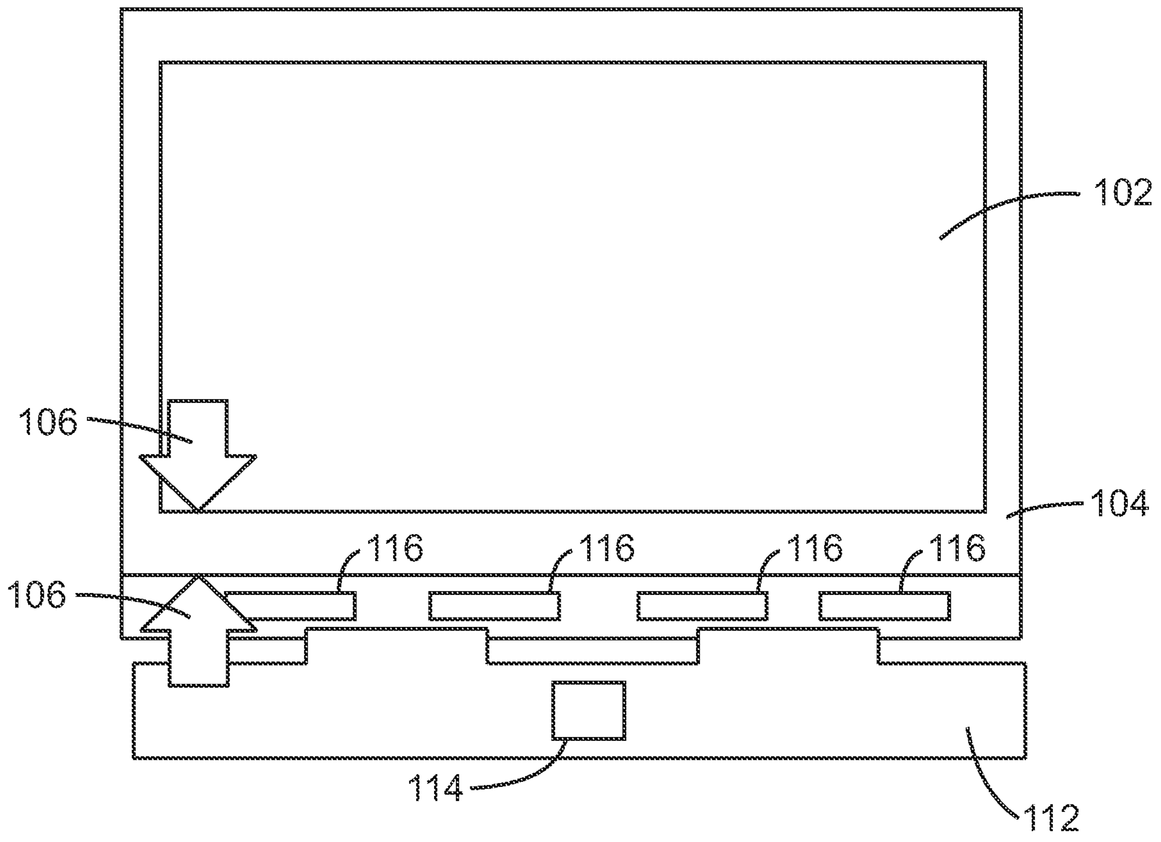
FIG. 1 illustrates a display.
Figure 2:
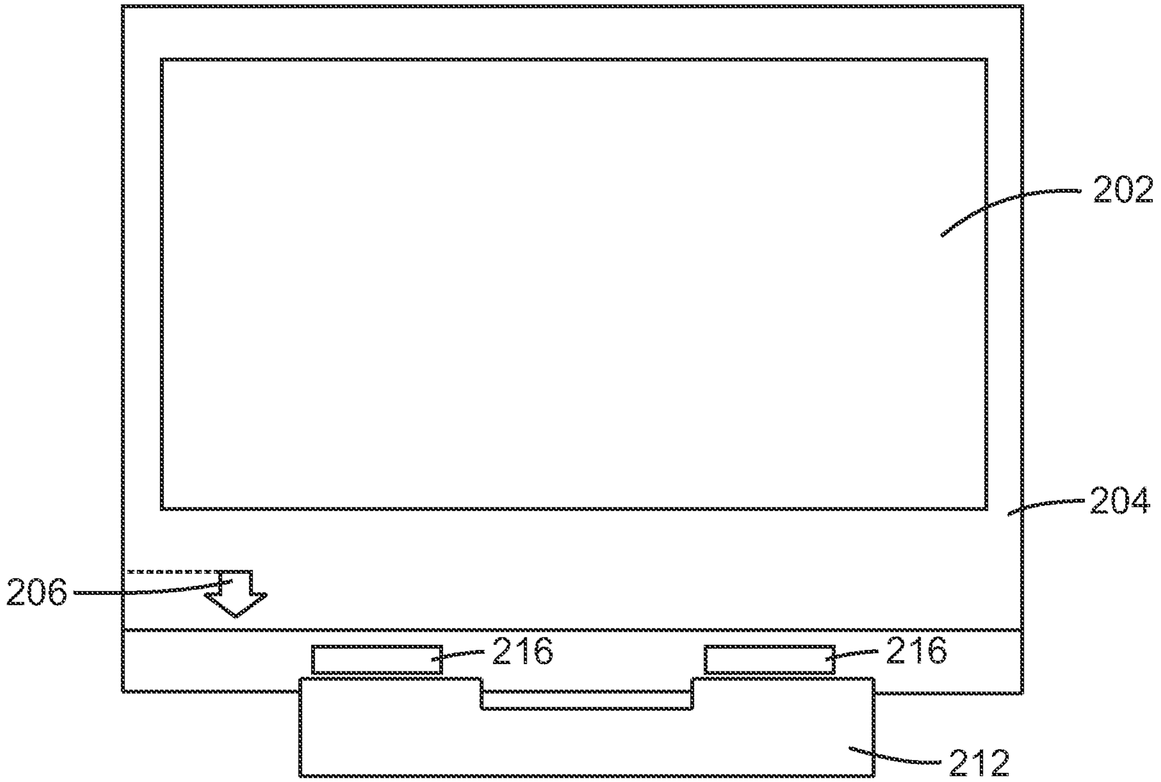
FIG. 2 illustrates a display.

FIG. 1 and FIG. 2 illustrate how a size of a display bezel (and/or a width of the bezel) may need to be increased. This need for increased bezel width can be due, for example, to integration of a combined timing controller and driver circuit. This integration can necessitate an increased bezel width, for example, due to larger traces (or signal paths) being required (due to a need to connect each timing controller and driver circuit output integrated circuit bumps to display panel data lines, for example). In some embodiments, combining a display timing controller (TCON) embedded driver circuit with a de-multiplexer (DEMUX) circuit can help minimize display bezel width.

FIG. 1 illustrates a display 100. Display 100 includes a screen 102 (for example, a display panel 102) and a bezel 104. Arrows 106 in FIG. 1 illustrate a width of bezel 104 at a bottom portion thereof. Display 100 also includes a printed circuit board (PCB) 112 (for example, a flexible printed circuit board 112) with a timing controller 114 disposed thereon. The printed circuit board 112 can be disposed, for example, on a rear surface of the display panel. Display 100 also includes display drivers 116 driving the display panel or screen 102. Drivers 116 can include one or more gate drivers and one or more data drivers, for example. Due to the printed circuit board 112, a thickness of the display panel may be thick. Additionally, due to a signal transmission between the timing controller 114 on the printed circuit board 112 and the data drivers 116, power consumption may be high.

FIG. 2 illustrates a display 200. Display 200 includes a screen 202 (for example, a display panel 202) and a bezel 204. Arrow 206 in FIG. 2 illustrates increased width of bezel 204 at a bottom portion thereof (for example, an increased width of bezel 204 relative to the width of bezel 104 in FIG. 1). Display 200 also includes a printed circuit board (PCB) 212 (for example, a flexible printed circuit board 212). The printed circuit board 212 can be disposed, for example, on a rear surface of the display panel. FIG. 2 does not illustrate a timing controller disposed on printed circuit board 212. Display 200 also includes display drivers 216 driving the display panel or screen 202. Drivers 216 can include one or more gate drivers and one or more data drivers, for example. In some embodiments, display drivers 216 include a timing controller (TCON) embedded driver. That is, in some embodiments, drivers 216 are timing controller embedded drivers. In some embodiments, drivers 216 combine two discrete functional components including a timing controller and a driver (for example, in a common integrated circuit or IC). The integration 216 of a timing controller and a driver can reduce cost via IC integration, can reduce logic power, and can result in a slim and/or smaller printed circuit board. For example, in some embodiments, cost of display 200 can be lower than cost of display 100 due to the integration of the timing controller and driver functions in combined timing controller and driver 216, lower power consumption since signal transmission between the timing controller and driver is significantly reduced, and because printed circuit board 212 can be slimmer and/or smaller than printed circuit board 112. However, a size of the panel bezel 204 (and/or a width of the panel bezel 204) may be increased (for example as illustrated by arrow 206) relative to a size of the panel bezel 104 (and/or a width of the panel bezel 104), for example, due to a need to operate a wider active area with each combined timing controller and driver 216. The size and/or width of panel bezel 204 may also be increased relative to panel bezel 104 in order to connect each timing controller and driver 216 output integrated circuit bumps to display panel data lines.

Figure 3:
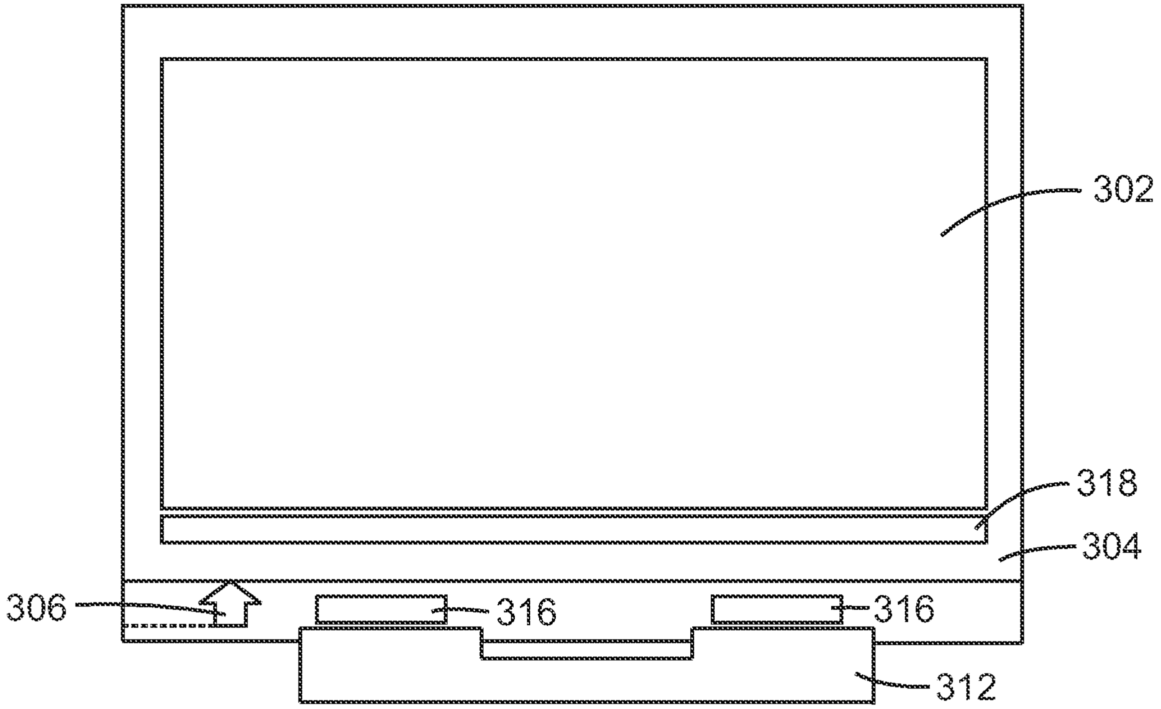
FIG. 3 illustrates a display.

FIG. 3 illustrates a display 300. Display 300 includes a screen 302 (for example, a display panel 302) and a bezel 304. Arrow 306 in FIG. 3 illustrates decreased width of bezel 304 at a bottom portion thereof (for example, a decreased width of bezel 304 relative to the width of bezel 204 in FIG. 2). Display 300 also includes a printed circuit board (PCB) 312 (for example, a flexible printed circuit board 312). The printed circuit board 312 can be disposed, for example, on a rear surface of the display panel. Similar to display 200 of FIG. 2, FIG. 3 does not illustrate a timing controller disposed on printed circuit board 312. Display 300 also includes display drivers 316 driving the display panel or screen 302. Drivers 316 can include one or more gate drivers and one or more data drivers, for example. In some embodiments, display drivers 316 include a timing controller (TCON) embedded driver. That is, in some embodiments, drivers 316 are timing controller embedded drivers. In some embodiments, drivers 316 combine two discrete functional components including a timing controller and a driver (for example, in a common integrated circuit or IC). The integration 316 of a timing controller and a driver can reduce cost via IC integration, can reduce logic power, and can result in a slim and/or smaller printed circuit board. For example, in some embodiments, cost of display 300 can be lower than cost of display 100 due to the integration of the timing controller and driver functions in combined timing controller and driver 316, lower power consumption since signal transmission between the timing controller and driver is significantly reduced, and because printed circuit board 312 can be slimmer and/or smaller than printed circuit board 112. Display 300 also includes a de-multiplexer (DEMUX) circuit 318. DEMUX circuit 318 can include transistors in the display panel circuit that can help alleviate an increased width of bezel 204 due to, for example, the need to operate a wider active area and/or in order to connect circuit 216 output bumps to display panel data lines. In some embodiments, arrow 306 illustrates this decrease in size and/or width of bezel 304 relative to bezel 204 of display 200 of FIG. 2.

In some embodiments such as, for example, those illustrated in FIG. 2 and FIG. 3, a timing controller (TCON) embedded driver circuit (for example, a timing controller embedded driver integrated circuit) can be implemented (for example, timing controller embedded driver circuit 216 and/or timing controller embedded driver circuit 316). In some embodiments, a de-multiplexer (DEMUX) block (or DEMUX circuit) can be included (for example, DEMUX circuit 318). In some embodiments, a slim display with a narrow bezel and low power consumption can be implemented using a timing controller (TCON) embedded driver circuit (for example, such as timing controller embedded driver circuit 316) with a de-multiplexer (DEMUX) block (for example, such as DEMUX circuit 318).

In some embodiments, a timing controller embedded driver integrated circuit (TED IC) can be implemented by combining two discrete functional components. In some embodiments, a timing controller and a driver circuit can be combined in a display such as a display with a thin film transistor (TFT) backplane, a TFT liquid crystal display (LCD) or an organic light emitting diode (OLED) display. A combined timing controller and driver circuit can result in a reduction of bill of material (BOM) cost (for example, due to IC integration), lower logic power, and/or slimmer (and/or smaller) printed circuit boards. Sometimes, however, a size and/or width of the display panel bezel (also sometimes referred to as "black matrix") can increase due to the integration of the timing controller and driver functionalities due to a need to operate a wider active area with one driver IC.

In some embodiments, a display such as, for example, a full high definition (FHD) display panel (for example, 1920 by 1080 by 3 colors such as red, green and blue subpixels) and/or a thin film transistor (TFT) display (and/or a display with a TFT backplane) is used. In some embodiments, the display has a display panel bezel width that is impacted as illustrated in FIGS. 1-3, for example. As illustrated in FIG. 1, a four source IC design (for example, four driver circuits 116) can be used. As illustrated in FIG. 2 and FIG. 3, however, a two source timing controller and driver circuit can be used, which can result in cost and/or technical benefits (for example, two driver circuits 216 in FIG. 2, two driver circuits 316 in FIG. 3, etc.) As illustrated in FIG. 2 relative to FIG. 1, however, panel bezel size and/or width can increase in order to connect timing controller and driver circuit output bumps to panel data lines. According to some embodiments, adding de-multiplexer transistors (for example, in a DEMUX circuit such as circuit 318) in the display panel circuit can help alleviate this increase in bezel size and/or width, and can enable a slimmer display bezel.

Figure 4:
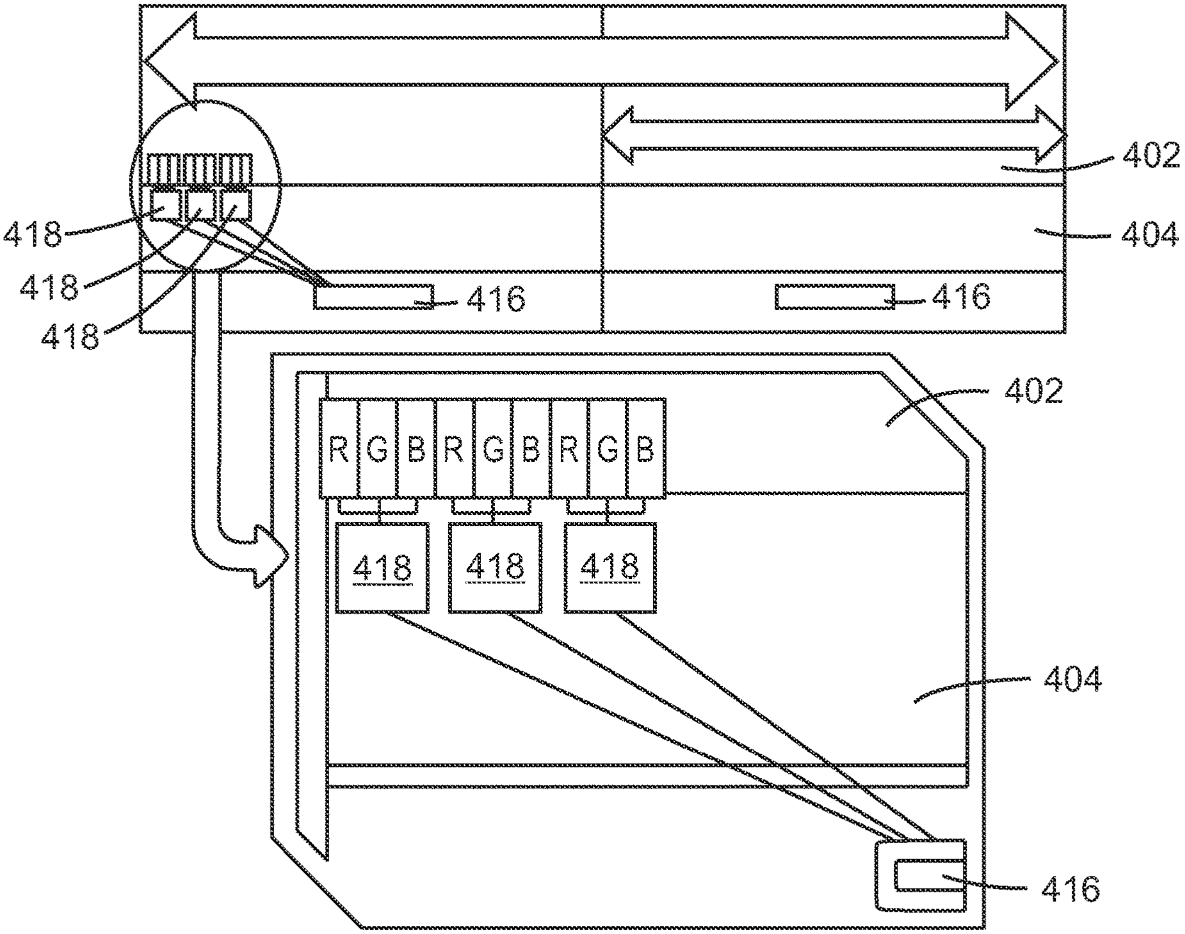
FIG. 4 illustrates a display.

FIG. 4 illustrates a display 400. Display 400 includes a screen 402 (for example, a display panel 402) and a bezel 404. Display 400 can also include a printed circuit board (for example, a flexible printed circuit board) not illustrated in FIG. 4. The printed circuit board can be disposed, for example, on a rear surface of the display panel. Similar to display 200 of FIG. 2 and display 300 of FIG. 3, a timing controller is not disposed on the printed circuit board. Display 400 also includes display drivers 416 driving the display panel or screen 402. Drivers 416 can include one or more gate drivers and one or more data drivers, for example. In some embodiments, display drivers 416 include a timing controller (TCON) embedded driver. That is, in some embodiments, drivers 416 are timing controller embedded drivers. In some embodiments, drivers 416 combine two discrete functional components including a timing controller and a driver (for example, in a common integrated circuit or IC). The integration 416 of a timing controller and a driver can reduce cost via IC integration, can reduce logic power, and can result in a slim and/or smaller printed circuit board. For example, in some embodiments, cost of display 400 can be lower than cost of display 100 due to the integration of the timing controller and driver functions in combined timing controller and driver 416, lower power consumption since signal transmission between the timing controller and driver is significantly reduced, and because the printed circuit board can be slimmer and/or smaller than printed circuit board 112. Display 400 also includes de-multiplexer (DEMUX) circuits 418. DEMUX circuits 418 can include transistors in the display panel circuit that can help alleviate an increased width of bezel 404 due to, for example, the need to operate a wider active area and/or in order to connect circuit 416 output bumps to display panel data lines. Each of DEMUX circuits 418 are coupled to red (R), green (G), and blue (B) subpixels of the display panel 402. In some embodiments, an arrow in FIG. 4 illustrates a blown up portion of display 400 including portions of the display screen 402, the bezel 404, one of the timing controller and driver circuits 416, DEMUX circuits 418, and the red, green and blue subpixels. A horizontal arrow in the display screen 402 extending across a width of screen 402 represents one horizontal line of pixels in the display screen, and a second horizontal arrow in the display screen 402 extending across half of the width of screen 402 represents one half a horizontal line of pixels in the display screen. For example, in embodiments, where the display screen is a full high definition (FHD) display screen with 1920 horizontal pixels and 1080 vertical pixels, for example, the full horizontal line arrow can represent 5,760 lines (1,920 pixels time 3 subpixels for each pixel such as R, G, and B subpixels), and the half horizontal line arrow can represent 2,880 lines (960 pixels times 3 subpixels for each pixel such as R, G, and B subpixels). In some embodiments, display 400 includes single DEMUX transistors in DEMUX 418.

Figure 5:
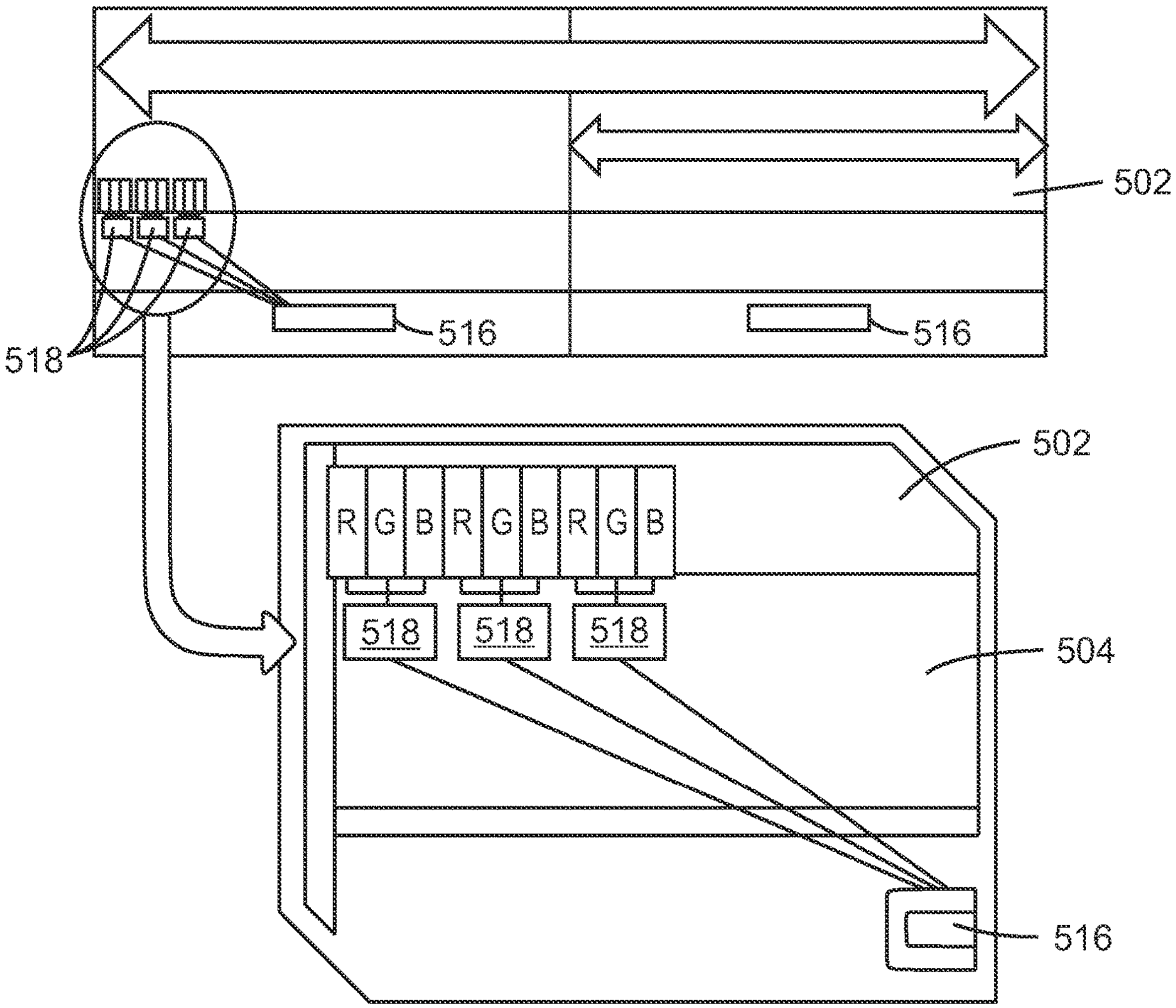
FIG. 5 illustrates a display.

FIG. 5 illustrates a display 500. Display 500 includes a screen 502 (for example, a display panel 502) and a bezel 504. Display 500 can also include a printed circuit board (for example, a flexible printed circuit board) not illustrated in FIG. 5. The printed circuit board can be disposed, for example, on a rear surface of the display panel. Similar to display 200 of FIG. 2 and display 300 of FIG. 3, a timing controller is not disposed on the printed circuit board. Display 500 also includes display drivers 516 driving the display panel or screen 502. Drivers 516 can include one or more gate drivers and one or more data drivers, for example. In some embodiments, display drivers 516 include a timing controller (TCON) embedded driver. That is, in some embodiments, drivers 516 are timing controller embedded drivers. In some embodiments, drivers 516 combine two discrete functional components including a timing controller and a driver (for example, in a common integrated circuit or IC). The integration 516 of a timing controller and a driver can reduce cost via IC integration, can reduce logic power, and can result in a slim and/or smaller printed circuit board. For example, in some embodiments, cost of display 500 can be lower than cost of display 100 due to the integration of the timing controller and driver functions in combined timing controller and driver 516, lower power consumption since signal transmission between the timing controller and driver is significantly reduced, and because the printed circuit board can be slimmer and/or smaller than printed circuit board 112. Display 500 also includes de-multiplexer (DEMUX) circuits 518. DEMUX circuits 518 can include transistors in the display panel circuit that can help alleviate an increased width of bezel 504 due to, for example, the need to operate a wider active area and/or in order to connect circuit 516 output bumps to display panel data lines. Each of DEMUX circuits 518 are coupled to red (R), green (G), and blue (B) subpixels of the display panel 502. In some embodiments, an arrow in FIG. 5 illustrates a blown up portion of display 500 including portions of the display screen 502, the bezel 504, one of the timing controller and driver circuits 516, DEMUX circuits 518, and the red, green and blue subpixels. A horizontal arrow in the display screen 502 extending across a width of screen 502 represents one horizontal line of pixels in the display screen, and a second horizontal arrow in the display screen 502 extending across half of the width of screen 502 represents one half a horizontal line of pixels in the display screen. For example, in embodiments, where the display screen is a full high definition (FHD) display screen with 1920 horizontal pixels and 1080 vertical pixels, for example, the full horizontal line arrow can represent 5,760 lines (1,920 pixels time 3 subpixels for each pixel such as R, G, and B subpixels), and the half horizontal line arrow can represent 2,880 lines (960 pixels times 3 subpixels for each pixel such as R, G, and B subpixels). In some embodiments, display 500 includes dual DEMUX transistors in DEMUX 518. In some embodiments, dual DEMUX 518 is smaller than single DEMUX 418, and allows for a thinner bezel 504 than the bezel 404 of display 400 in FIG. 4.

Figure 6:
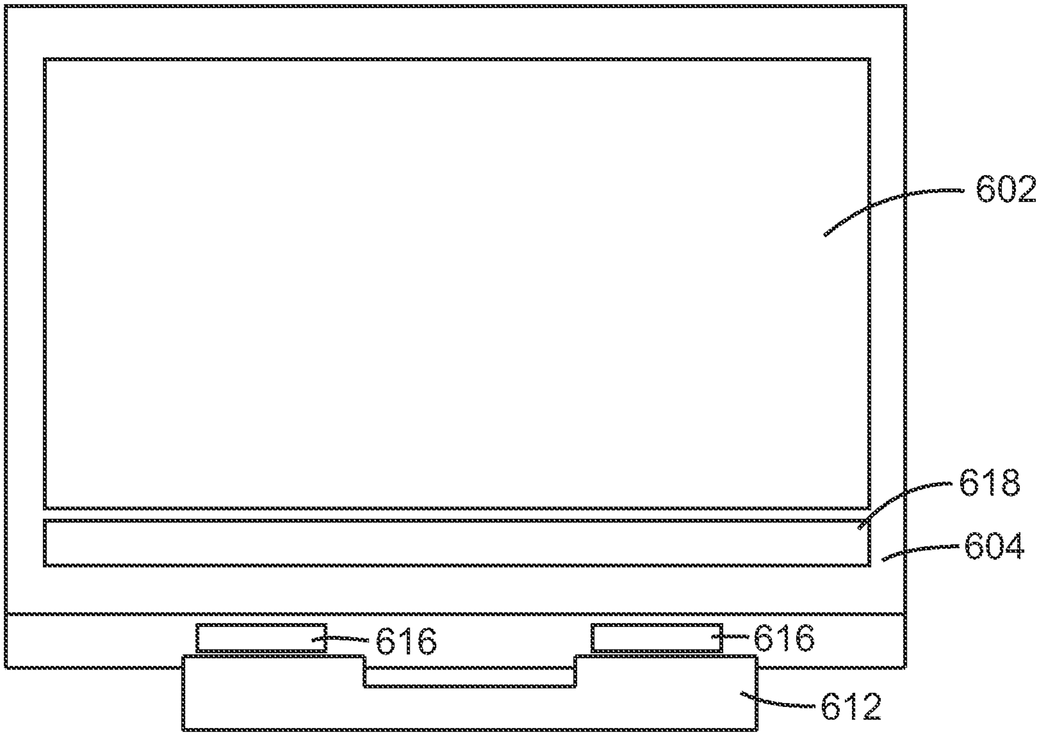
FIG. 6 illustrates a display.

FIG. 6 illustrates a display 600. Display 600 includes a screen 602 (for example, a display panel 602) and a bezel 604. Display 600 also includes a printed circuit board (PCB) 612 (for example, a flexible printed circuit board 612). The printed circuit board 612 can be disposed, for example, on a rear surface of the display panel. FIG. 6 does not illustrate a timing controller disposed on printed circuit board 612. Display 600 also includes display drivers 616 driving the display panel or screen 602. Drivers 616 can include one or more gate drivers and one or more data drivers, for example. In some embodiments, display drivers 616 include a timing controller (TCON) embedded driver. That is, in some embodiments, drivers 616 are timing controller embedded drivers. In some embodiments, drivers 616 combine two discrete functional components including a timing controller and a driver (for example, in a common integrated circuit or IC). The integration 616 of a timing controller and a driver can reduce cost via IC integration, can reduce logic power, and can result in a slim and/or smaller printed circuit board. For example, in some embodiments, cost of display 600 can be lower than cost of display 100 due to the integration of the timing controller and driver functions in combined timing controller and driver 616, lower power consumption since signal transmission between the timing controller and driver is significantly reduced, and because printed circuit board 612 can be slimmer and/or smaller than printed circuit board 112. Display 600 also includes a de-multiplexer (DEMUX) circuit 618. DEMUX circuit 618 can include transistors in the display panel circuit that can help alleviate an increased width of bezel 204 due to, for example, the need to operate a wider active area and/or in order to connect circuit 616 output bumps to display panel data lines. In some embodiments, DEMUX circuit 618 can be a single DEMUX circuit with single DEMUX transistors per data driver line, for example.

Figure 7:
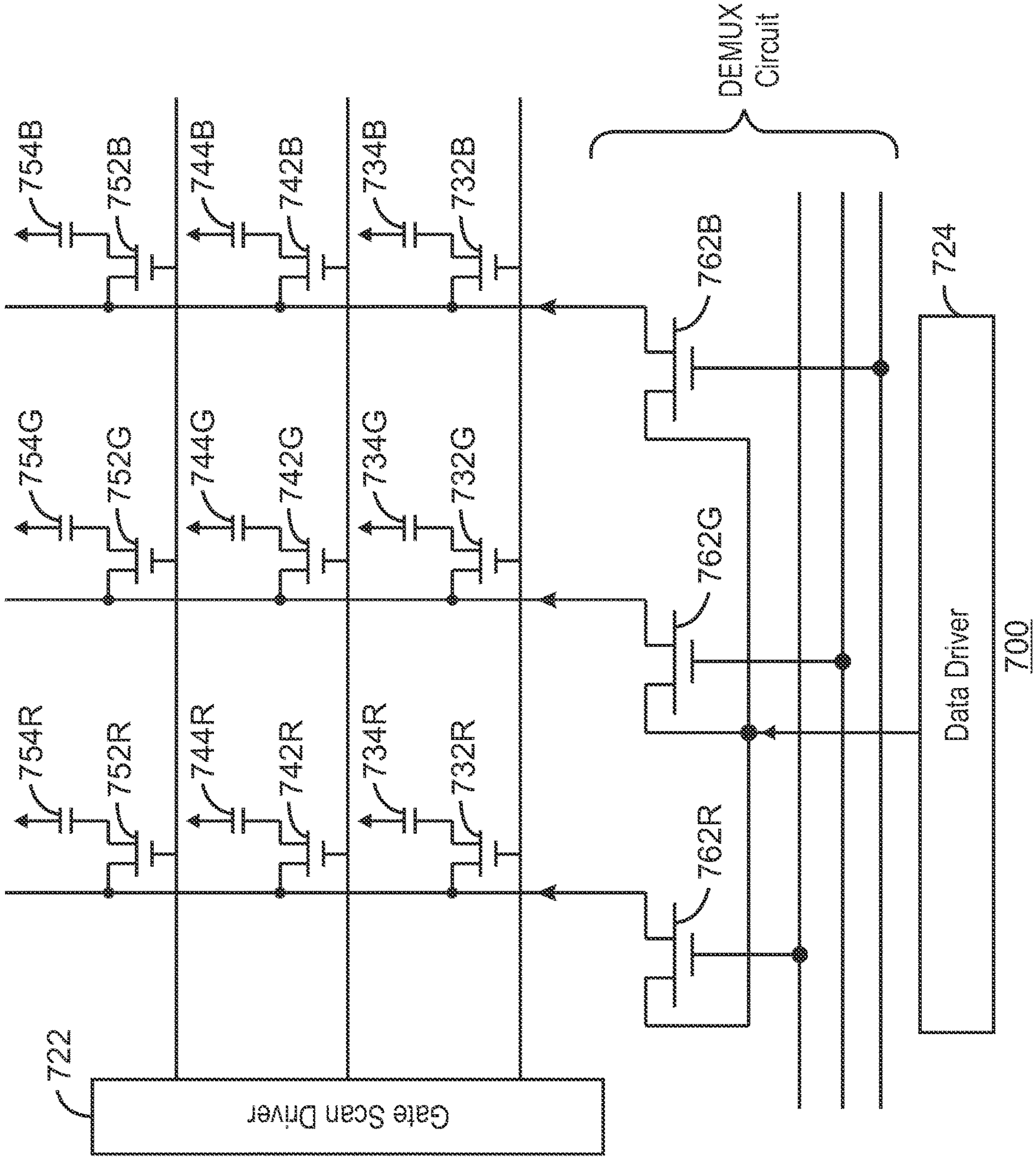
FIG. 7 illustrates a display circuit.

FIG. 7 illustrates display circuit 700. In some embodiments, display circuit 700 includes a gate scan driver 722 and a data driver 724 (for example, a timing controller embedded data driver 724). In some embodiments, drivers 722 and 724 can be included in a circuit such as, for example, circuit 318 of display 300 or circuit 418 of circuit 400. FIG. 7 illustrates only three lines driven by gate scan driver 722, but gate scan driver 722 can drive more lines in some embodiments. Similarly, FIG. 7 illustrates only three lines driven by data driver 724, but data driver 724 can drive more lines in some embodiments.

A first (bottom) row of red (R), green (G), and blue (B) transistors 732R, 732G, and 732B are coupled to the bottom line from gate scan driver 722. A first (bottom) row of red (R), green (G), and blue (B) light emitting diodes (LEDs) 734R, 734G, and 734B are coupled to transistors 732R, 732G, and 732B, respectively. A second (middle) row of red (R), green (G), and blue (B) transistors 742R, 742G, and 742B are coupled to the middle line from gate scan driver 722. A second (middle) row of red (R), green (G), and blue (B) light emitting diodes (LEDs) 744R, 744G, and 744B are coupled to transistors 742R, 742G, and 742B, respectively. A third (top) row of red (R), green (G), and blue (B) transistors 752R, 752G, and 752B are coupled to the top line from gate scan driver 722. A third (top) row of red (R), green (G), and blue (B) light emitting diodes (LEDs) 754R, 754G, and 754B are coupled to transistors 752R, 752G, and 752B, respectively.

Display circuit 700 also includes a DEMUX circuit including transistors 762R, 762G and 762B each coupled to data driver 724. The DEMUX circuit in display circuit 700 can be referred to as a single transistor DEMUX circuit with a single transistor for each subpixel data line. Transistor 762R is coupled to data driver 724, a first subpixel line (R subpixel data line), and to transistors 732R, 742R, and 752R. Transistor 762G is coupled to data driver 724, a second subpixel line (G subpixel data line), and to transistors 732G, 742G, and 752G. Transistor 762B is coupled to data driver 724, a third subpixel line (B subpixel data line), and to transistors 732B, 742B, and 752B.

Figure 8:
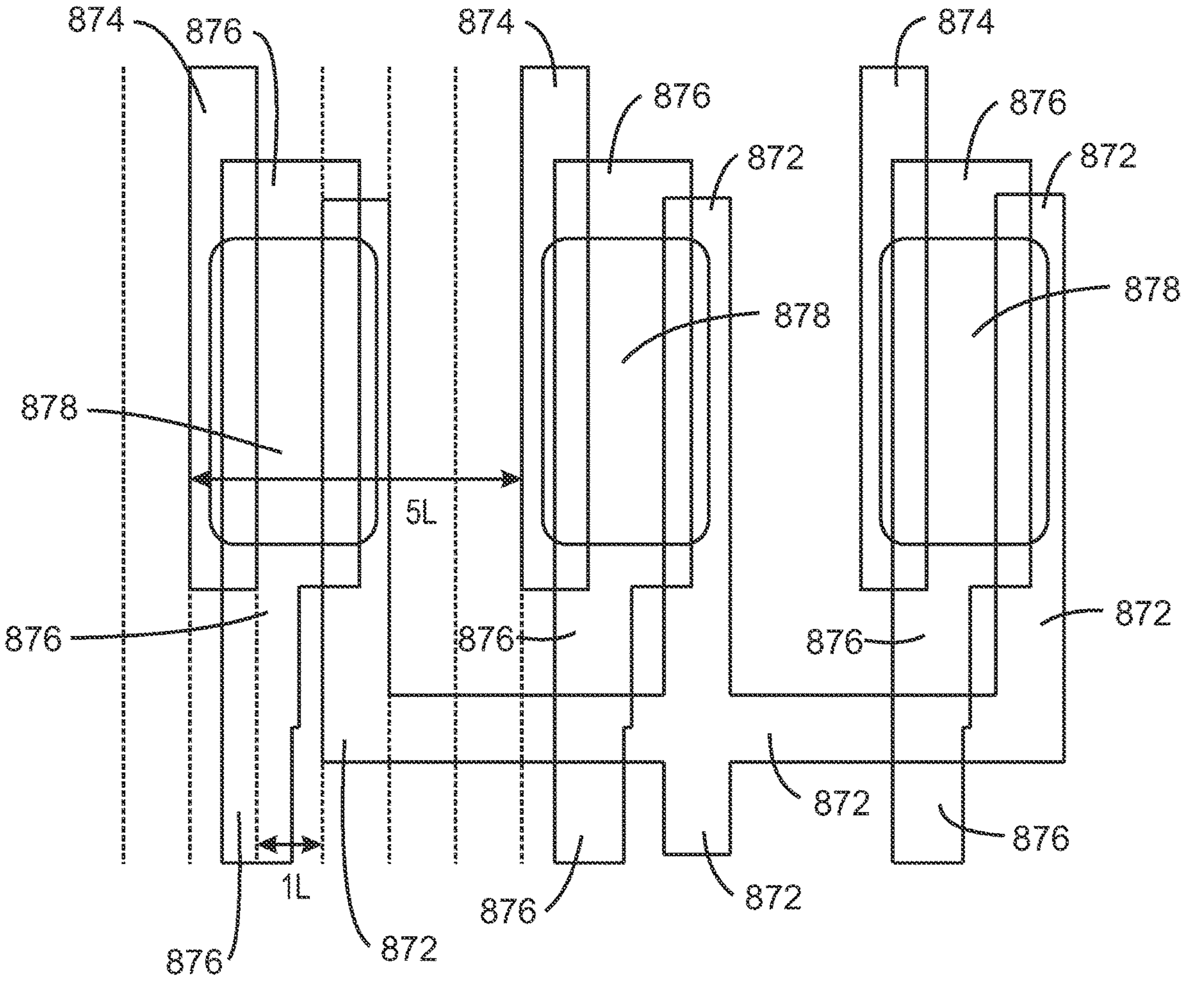
FIG. 8 illustrates a display circuit layout.

FIG. 8 illustrates a single DEMUX display circuit layout 800. In some embodiments, layout 800 illustrates a layout for the single DEMUX display circuit illustrated in FIG. 7. In some embodiments, layout 800 illustrates a layout for transistors 762R, 762G, and 762B of the DEMUX display circuit illustrated in FIG. 7. Layout 800 includes a source line 872 for three transistors. In some embodiments, source line 872 corresponds to the line coupled to data driver 724 in circuit 700 illustrated in FIG. 7. Layout 800 includes three drain lines 874 for three transistors. In some embodiments, drain lines 874 correspond to the R, G and B subpixel lines coupled to transistors 732R, 732G, 732B, 742R, 742G, 742B, 752R, 752G, and 752B of circuit 700 illustrated in FIG. 7. Layout 800 includes three gate lines 876 for three transistors. In some embodiments, gate lines 876 correspond to the R, G and B subpixel data lines in the DEMUX circuit illustrated in FIG. 7. Layout 800 also can include oxide material 878 for each of the three transistors. In some embodiments, dotted vertical lines in FIG. 8 illustrate, for example, a transistor channel length L. As illustrated in FIG. 8, in some embodiments, the length between adjacent transistors is five channel lengths (5L).

Figure 9:
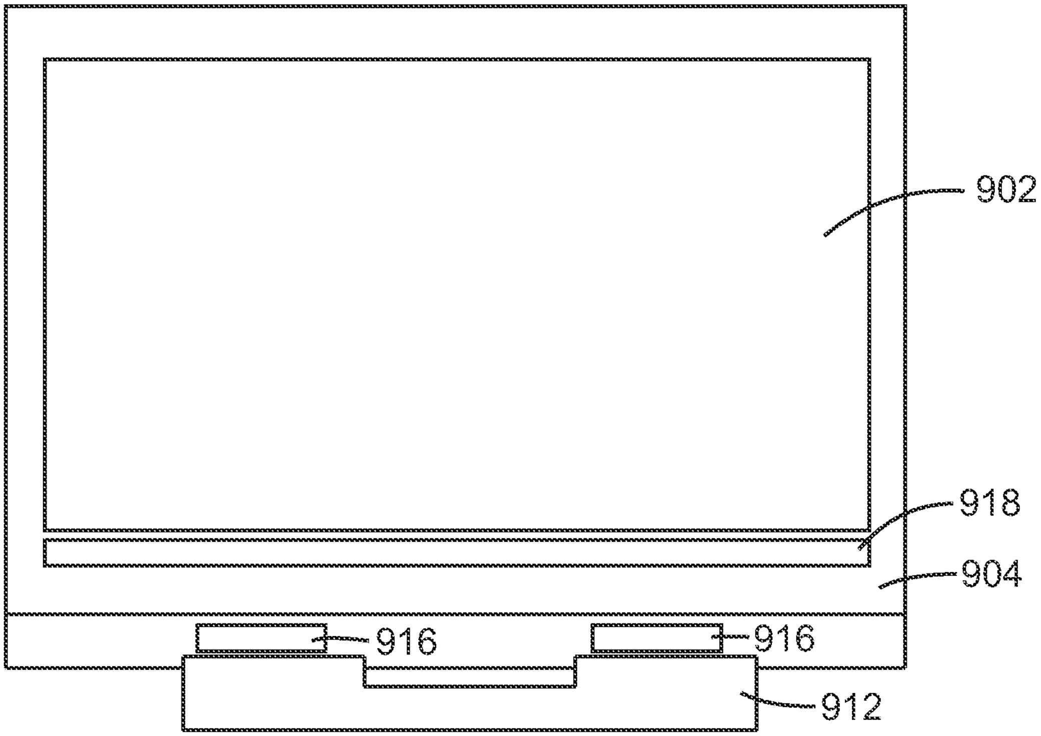
FIG. 9 illustrates a display.

FIG. 9 illustrates a display 900. Display 900 includes a screen 902 (for example, a display panel 902) and a bezel 904. Display 900 also includes a printed circuit board (PCB) 912 (for example, a flexible printed circuit board 912). The printed circuit board 912 can be disposed, for example, on a rear surface of the display panel. FIG. 9 does not illustrate a timing controller disposed on printed circuit board 912. Display 900 also includes display drivers 916 driving the display panel or screen 902. Drivers 916 can include one or more gate drivers and one or more data drivers, for example. In some embodiments, display drivers 916 include a timing controller (TCON) embedded driver. That is, in some embodiments, drivers 916 are timing controller embedded drivers. In some embodiments, drivers 916 combine two discrete functional components including a timing controller and a driver (for example, in a common integrated circuit or IC). The integration 916 of a timing controller and a driver can reduce cost via IC integration, can reduce logic power, and can result in a slim and/or smaller printed circuit board. For example, in some embodiments, cost of display 900 can be lower than cost of display 100 due to the integration of the timing controller and driver functions in combined timing controller and driver 916, lower power consumption since signal transmission between the timing controller and driver is significantly reduced, and because printed circuit board 912 can be slimmer and/or smaller than printed circuit board 112. Display 900 also includes a de-multiplexer (DEMUX) circuit 918. DEMUX circuit 918 can include transistors in the display panel circuit that can help alleviate an increased width of bezel 204 due to, for example, the need to operate a wider active area and/or in order to connect circuit 916 output bumps to display panel data lines. In some embodiments, DEMUX circuit 918 can be a dual DEMUX circuit with dual DEMUX transistors per data driver line, for example. In some embodiments, a width of dual DEMUX circuit 918 can be less than a width of single DEMUX circuit 618 of display 600 of FIG. 6. In some embodiments, this thinner width is shown from a top to bottom of DEMUX circuits 618 of display 600 and from a top to bottom of DEMUX circuits 918 of display 900. This thinner width of DEMUX circuit 918 relative to DEMUX circuit 618 can result in a thinner width of the bottom portion of bezel 904 relative to a width of the bottom portion of bezel 604 of display 600 of FIG. 6, for example. In some embodiments, a width (top to bottom width in FIG. 6 and FIG. 9) of a bottom portion of bezel 904 of display 900 can be half of the width of a bottom portion of bezel 604 of display 600.

Figure 10:
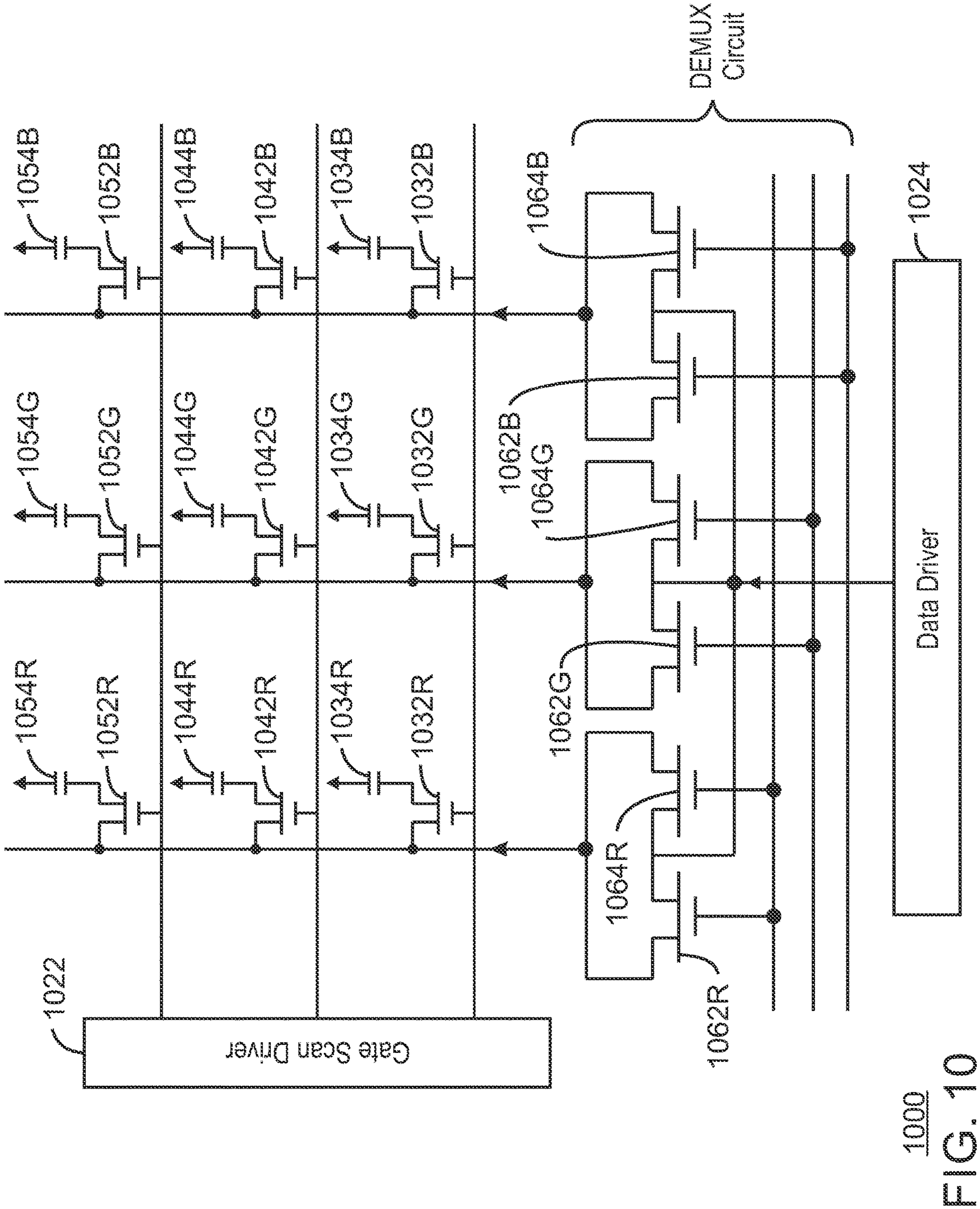
FIG. 10 illustrates a display circuit.

FIG. 10 illustrates display circuit 1000. In some embodiments, display circuit 1000 includes a gate scan driver 1022 and a data driver 1024 (for example, a timing controller embedded data driver 1024). In some embodiments, drivers 1022 and 1024 can be included in a circuit such as, for example, circuit 318 of display 300 or circuit 518 of circuit 500. FIG. 10 illustrates only three lines driven by gate scan driver 1022, but gate scan driver 1022 can drive more lines in some embodiments. Similarly, FIG. 10 illustrates only three lines driven by data driver 1024, but data driver 1024 can drive more lines in some embodiments.

A first (bottom) row of red (R), green (G), and blue (B) transistors 1032R, 1032G, and 1032B are coupled to the bottom line from gate scan driver 1022. A first (bottom) row of red (R), green (G), and blue (B) light emitting diodes (LEDs) 1034R, 1034G, and 1034B are coupled to transistors 1032R, 1032G, and 1032B, respectively. A second (middle) row of red (R), green (G), and blue (B) transistors 1042R, 1042G, and 1042B are coupled to the middle line from gate scan driver 1022. A second (middle) row of red (R), green (G), and blue (B) light emitting diodes (LEDs) 1044R, 1044G, and 1044B are coupled to transistors 1042R, 1042G, and 1042B, respectively. A third (top) row of red (R), green (G), and blue (B) transistors 1052R, 1052G, and 1052B are coupled to the top line from gate scan driver 1022. A third (top) row of red (R), green (G), and blue (B) light emitting diodes (LEDs) 1054R, 1054G, and 1054B are coupled to transistors 1052R, 1052G, and 1052B, respectively.

Display circuit 1000 also includes a DEMUX circuit including transistors 1062R, 1064R, 1062G, 1064G, 1062B, and 1064B each coupled to data driver 1024. The DEMUX circuit in display circuit 1000 can be referred to as a dual transistor DEMUX circuit with two transistors for each subpixel data line. Transistors 1062R and 1064R are coupled to each other and also are coupled to data driver 1024, a first subpixel line (R subpixel data line), and to transistors 1032R, 1042R, and 1052R. Transistor 1062G and 1064G are coupled to each other and are also coupled to data driver 1024, a second subpixel line (G subpixel data line), and to transistors 1032G, 1042G, and 1052G. Transistors 1062B and 1064B are coupled to each other, and are also coupled to data driver 1024, a third subpixel line (B subpixel data line), and to transistors 1032B, 1042B, and 1052B.

Figure 11:
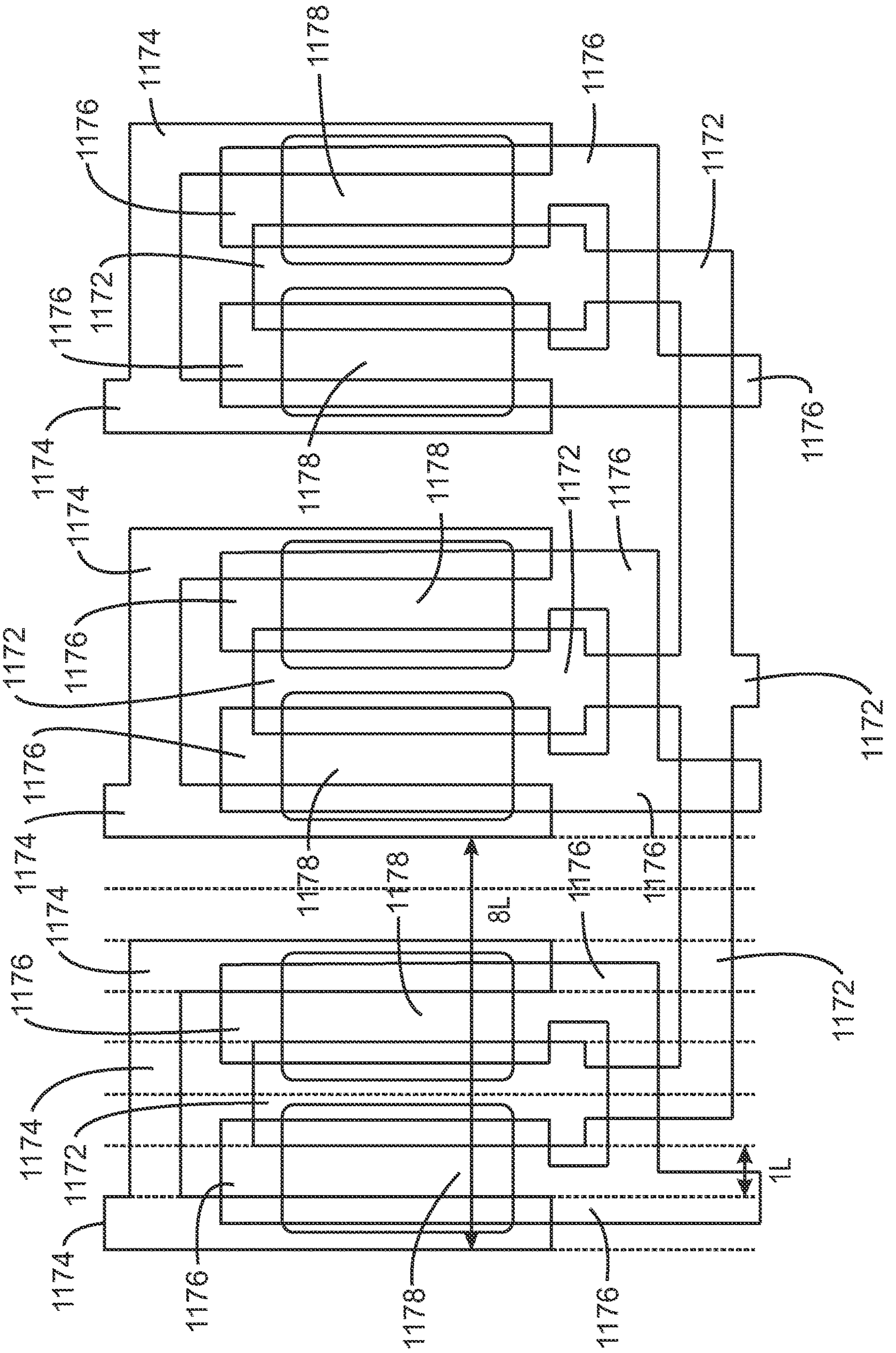
FIG. 11 illustrates a display circuit layout.

FIG. 11 illustrates a dual DEMUX display circuit layout 1100. In some embodiments, layout 1100 illustrates a layout for the dual DEMUX display circuit illustrated in FIG. 10. In some embodiments, layout 1100 illustrates a layout for transistors 1062R, 1064R, 1062G, 1064G, 1062B, and 1064B of the DEMUX display circuit illustrated in FIG. 10. Layout 1100 includes a source line 1172 for six transistors. In some embodiments, source line 1172 corresponds to the line coupled to data driver 1124 in circuit 1000 illustrated in FIG. 10. Layout 1100 includes three drain lines 1174 for six transistors. Each drain line 1174 is coupled to a pair of transistors. In some embodiments, drain lines 1174 correspond to the R, G and B subpixel lines coupled to transistors 1032R, 1032G, 1032B, 1042R, 1042G, 1042B, 1052R, 1052G, and 1052B of circuit 1000 illustrated in FIG. 10. Layout 1100 includes three gate lines 1176 for six transistors. Each gate line 1176 is coupled to a pair of transistors. In some embodiments, gate lines 1176 correspond to the R, G and B subpixel data lines in the DEMUX circuit illustrated in FIG. 10. Layout 1100 also can include oxide material 1178 for each of the six transistors. In some embodiments, dotted vertical lines in FIG. 11 illustrate, for example, a transistor channel length L. As illustrated in FIG. 11, in some embodiments, the length between adjacent transistor pairs is eight channel lengths (8L).

In some embodiments such as, for example, those illustrated in FIGS. 2-11, a timing controller (TCON) embedded driver circuit (for example, a timing controller embedded driver integrated circuit) can be implemented. In some embodiments, such as, for example, those illustrated in FIGS. 3-11, a de-multiplexer (DEMUX) block (or DEMUX circuit) can be included. In some embodiments, a slim display with a narrow bezel and low power consumption can be implemented using a timing controller (TCON) embedded driver circuit (for example, such as timing controller embedded driver circuit 316, 416, 516, 616, and/or 724, etc.) with a de-multiplexer (DEMUX) block (for example, such as DEMUX circuit 318, 418, 518, 618, DEMUX circuit in FIG. 7, 918, and/or DEMUX circuit in FIG. 10, etc.).

In some embodiments, a timing controller embedded driver integrated circuit (TED IC) can be implemented by combining two discrete functional components. In some embodiments, a timing controller and a driver circuit can be combined in a display with a thin film transistor (TFT) backplane, a TFT liquid crystal display (LCD) or an organic light emitting diode (OLED) display. A combined timing controller and driver circuit can result in a reduction of bill of material (BOM) cost (for example, due to IC integration), lower logic power, and/or slimmer (and/or smaller) printed circuit boards. Sometimes, however, a size and/or width of the display panel bezel (also sometimes referred to as "black matrix") can increase due to the integration of the timing controller and driver functionalities due to a need to operate a wider active area with one driver IC.

In some embodiments, a display such as, for example, a full high definition (FHD) display panel (for example, 1920 by 1080 by 3 colors such as red, green and blue subpixels) and/or a thin film transistor (TFT) display (or display with a TFT backplane) is used. In some embodiments, the display has a display panel bezel width that is impacted as illustrated in FIGS. 1-3, for example. As illustrated in FIG. 1, a four source IC design (for example, four driver circuits 116) can be used. As illustrated in FIG. 2 and FIG. 3, however, a two source timing controller and driver circuit can be used, which can result in cost and/or technical benefits (for example, two driver circuits 216 in FIG. 2, two driver circuits 316 in FIG. 3, etc.) As illustrated in FIG. 2 relative to FIG. 1, however, panel bezel size and/or width can increase in order to connect timing controller and driver circuit output bumps to panel data lines. According to some embodiments, adding de-multiplexer transistors (for example, in DEMUX circuits such as circuits 318, 418, 518, 618, DEMUX circuit in FIG. 7, 918, and/or DEMUX circuit in FIG. 10, etc.) in the display panel circuit can help alleviate this increase in bezel size and/or width, and can enable a slimmer display bezel.

In some embodiments, such as, for example, illustrated in some embodiments of FIG. 5, FIG. 10, and FIG. 11, use of dual drain output DEMUX transistors (for example, such as transistors 1062R, 1064R, 1062G, 1064G, 1062B, 1064B and the six transistors illustrated in FIG. 11), oxide thin film transistors (TFTs) can be used in DEMUX circuits of display panels. These dual drain output DEMUX transistors can be used to compensate for a TFT mobility difference between low temperature polycrystalline silicon (LTPS) TFT and oxide TFT display panels. In some embodiments, low frame rates may be implemented to expand timing controller embedded driver integrated circuit implementations for higher resolution displays. In some embodiments, any of the transistors illustrated and/or described herein can be thin film transistors (TFTs). In some embodiments, any of the transistors illustrated and/or described herein can be low temperature polycrystalline silicon (LTPS) transistors, oxide transistors, or amorphous silicon transistors.

In some embodiments, implementation of a combined timing controller and driver circuit on an oxide thin film transistor (TFT) backplane display can improve costs and power savings, but may require an unattractive wider bezel for signal routing (for example, in some embodiments, as illustrated in FIG. 2). However, use of a DEMUX circuit as described herein can remove the need for such an unattractive wider bezel. Additionally, in some embodiments, a dual output DEMUX transistor design can help reduce the DEMUX transistor size by half as compared to a single DEMUX transistor design (for example, in some embodiments, as illustrated in some embodiments of FIG. 4 by single DEMUX transistor design circuit 418 compared with some embodiments of FIG. 5 by dual DEMUX transistor design circuit 518).

In some embodiments, considering a low mobility of oxide (for example, 10 $cm^2$/vsec) and typical LTPS mobility of 100 $cm^2$/vsec, a single oxide DEMUX transistor design might need to be increased by ten times (that is, 1,200 μm/3 μm) for transistor width to length ratio (W/L), resulting in a 1.2 mm panel bezel (an 1,080 μm increment). On the other hand, with dual oxide DEMUX TFTs, the DEMUX circuit can have the same transistor output with only a 600 μm/3 μm width to length (W/L), or a 0.6 mm panel bezel (480 μm increment).

In some embodiments, an integrated timing controller (TCON) plus driver integrated circuit (TCON+driver IC or TED IC) can be used to reduce platform cost and/or to reduce logic IC power. In some embodiments, this approach can be implemented using TFTs such as LTPS transistors, oxide transistors, or amorphous silicon transistors. It can be used for small size displays and high resolution displays, for example. LTPS TFT display backplanes are known to have high mobility (for example, 100 $cm^2$/vsec) as compared with oxide TFT display backplanes (for example, 10 to 30 $cm^2$/vsec) and amorphous silicon (a-Si) TFT display backplanes (for example 0.3 $cm^2$/vsec). High mobility can enable implementation of de-multiplexing (DEMUX) circuitry within the display panel. However, in some embodiments, LTPS TFT backplane technology can be limited to smaller sizes due to industry capacity and high manufacturing costs. In some embodiments, integrated timing controller plus driver integrated circuit (TED IC) technology can be extended to larger size displays. In some embodiments, this extension to larger size displays can be made through use of oxide TFT display backplanes.

In some embodiments, DEMUX circuits such as, for example, DEMUX circuits illustrated in FIGS. 3-11) can be oxide TFT DEMUX transistor circuits. In some embodiments, DEMUX circuits can be dual DEMUX transistor circuits (for example, as illustrated in FIGS. 5 and 9-11). In some embodiments, dual DEMUX transistor circuits can provide a slimmer panel bezel than single DEMUX transistor circuits.

In some embodiments, such as, for example, DEMUX circuits illustrated in FIGS. 7 and 10, each sub-pixels (for example, each RGB sub-pixels) image data transfer to one fan-out line to the DEMUX circuit. The DEMUX circuit splits the sub-pixel data (for example, the RGB sub-pixel data) into each respective sub-pixel data line during one gate scan time.

In some embodiments, a single DEMUX TFT implementation can be used in high mobility and/or high pixel per inch (PPI) displays. For example, in some embodiments, a single DEMUX TFT implementation can be used in LTPS TFT LCD or OLED implementations. This can be implemented in a single DEMUX TFT implementation that only has one transistor output (for example, one drain output) per sub-pixel, where DEMUX TFT pitch is small (for example, five times the channel length or 5L).

In some embodiments, dual DEMUX TFT implementations can be more efficient than single DEMUX TFT implementations such as those having two output (drain) nodes with only one input (source) node per sub-pixel. Use of dual TFT DEMUX implementations can reduce transistor channel width (and/or can reduce transistor width to length ratio, and/or can reduce transistor size) by 50% relative to a single TFT DEMUX implementation. This can result in a panel bezel width reduction, for example. With a same layout design rule, dual DEMUX TFT pitch can be bigger than a single type (8L vs. 5L, for example). In some embodiments, dual DEMUX TFT can be particularly beneficial for oxide TFT DEMUX and low pixel per inch (for example, lower than 300 PPI).

In some embodiments, a fixed low frame rate (FLFR) can be used. Use of a fixed low frame rate (for example, in some embodiments, below 60 Hz) can increase viability of timing controller embedded data driver IC combined with DEMUX approaches. This can allow a further extension of cost and power consumption benefits to higher pixel per inch (PPI) implementations. In some embodiments, driving at a low frequency can allow for lower power consumption when combined with logic power savings of timing controller embedded data driver IC (TED IC) implementations. In some embodiments, combining DEMUX circuit implementation with fixed low frame rate (FLFR) can help in providing a slim design with cost efficient and lower power displays. This can be implemented, for example, in mobile devices such as a 2in1 mobile computing device, for example.

In some embodiments, an ultra-high-definition (UHD) implementation can be implemented. For example, a 13.3 inch UHD display may have a 25.5 μm subpixel pitch as 332 PPI. One UHD gate scan time can be around 7.73 μsec at 60 Hz (without considering blanking time and others, for example). In implementations using RGB DEMUX, this time can be 2.53 μsec, for example. In a 30 Hz implementation, one gate scan time can be around 15.43 μsec. In a 1 to 3 RGB DEMUX implementation, the time can become around 5.143 μsec, and in a 1 to 2 DEMUX it can be around 7.715 μsec. In a 40 Hz implementation, one gate scan time can be around 11.57 μsec, and 1 to 3 RGB DEMUX can bring the time down to 3.86 μsec, and 1 to 2 DEMUX can bring the time down to around 5.785 μsec, for example.

Figure 12:
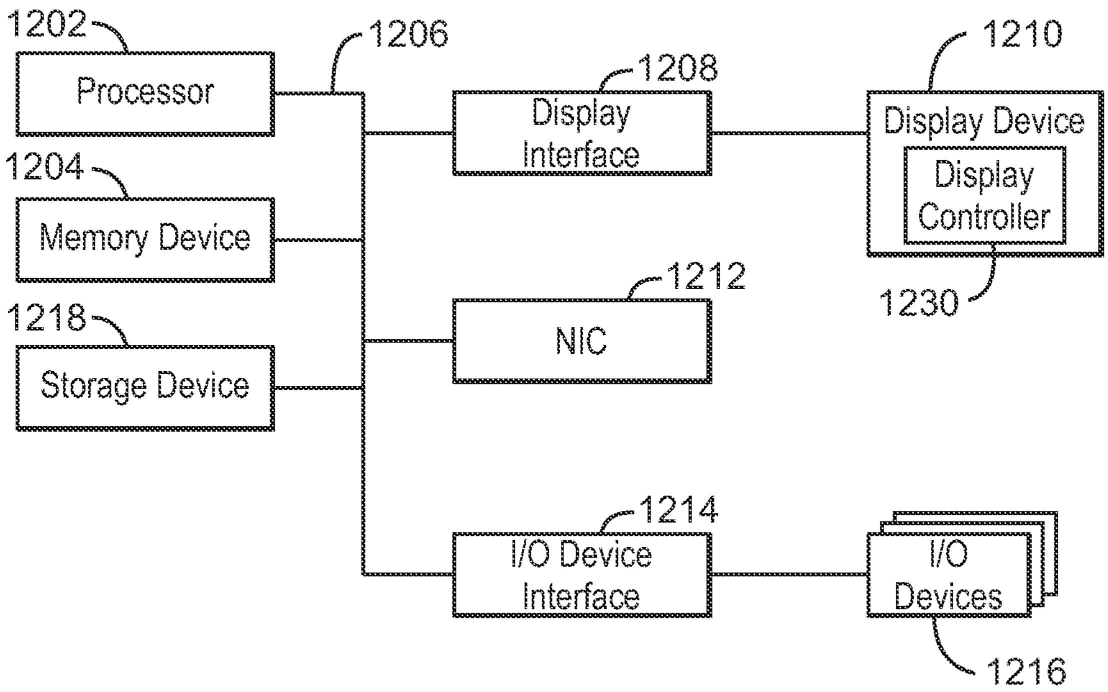
FIG. 12 illustrates a computing device.

FIG. 12 is a block diagram of an example of a computing device 1200. In some embodiments, computing device 1200 can be included in a device that can include one or more displays, display circuits, DEMUX, and/or any other circuits or functionality as described and/or illustrated herein. The computing device 1200 may include a processor 1202 that is adapted to execute stored instructions, as well as a memory device 1204 (and/or storage device 1204) that stores instructions that are executable by the processor 1202. The processor 1202 can be a single core processor, a multi-core processor, a computing cluster, or any number of other configurations. For example, processor 1202 can be an Intel® processor such as an Intel® Celeron, Pentium, Core, Core i3, Core i5, or Core i7 processor. In some embodiments, processor 1202 can be an Intel® x86 based processor. In some embodiments, processor 1202 can be an ARM based processor. The memory device 1204 can be a memory device and/or a storage device, and can include volatile storage, non-volatile storage, random access memory, read only memory, flash memory, and/or any other suitable memory and/or storage systems.

The processor 1202 may also be linked through a system interconnect 1206 (e.g., PCI®, PCI-Express®, NuBus, etc.) to a display interface 1208 adapted to connect the computing device 1200 to a display device 1210. In some embodiments, display device 1210 can include one or more displays, display circuits, DEMUX, and/or any other circuits or functionality as described and/or illustrated herein. The display device 1210 may include a display screen that is a built-in component of the computing device 1200. The display device 810 may include a display panel, a display backlight, display circuits, DEMUX, and/or display drivers, for example.

In some embodiments, the display interface 1208 can include any suitable graphics processing unit, transmitter, port, physical interconnect, and the like. In some examples, the display interface 1208 can implement any suitable protocol for transmitting data to the display device 1210. For example, the display interface 1208 can transmit data using a high-definition multimedia interface (HDMI) protocol, a DisplayPort protocol, or some other protocol or communication link, and the like In some embodiments, display device 1210 includes a display controller. In some embodiments, a display controller can provide control signals within and/or to the display device. In some embodiments, a display controller can be included in the display interface 1208 (and/or instead of the display interface 1208). In some embodiments, a display controller can be coupled between the display interface 1208 and the display device 1210. In some embodiments, the display controller can be coupled between the display interface 1208 and the interconnect 1206. In some embodiments, the display controller can be included in the processor 1202. In some embodiments, the display controller can implement functionality according to any of the examples illustrated in any of the drawings and/or as described anywhere herein.

In some embodiments, any of the techniques described in this specification can be implemented entirely or partially within the display device 1210. In some embodiments, any of the techniques described in this specification can be implemented entirely or partially within a display controller. In some embodiments, any of the techniques described in this specification can be implemented entirely or partially within the processor 1202.

In addition, a network interface controller (also referred to herein as a NIC) 1212 may be adapted to connect the computing device 1200 through the system interconnect 1206 to a network (not depicted). The network (not depicted) may be a wireless network, a wired network, cellular network, a radio network, a wide area network (WAN), a local area network (LAN), a global position satellite (GPS) network, and/or the Internet, among others.

The processor 1202 may be connected through system interconnect 1206 to an I/O interface 1214. I/O interface 1214 can be used to couple interconnect 1206 with one or more I/O devices 1216. One or more input/output (I/O) device interfaces 1214 may be adapted to connect the computing host device 1200 to one or more I/O devices 1216. The I/O devices 1216 may include, for example, a keyboard and/or a pointing device, where the pointing device may include a touch pad or a touchscreen, among others. The I/O devices 1216 may be built-in components of the computing device 1200, or may be devices that are externally connected to the computing device 1200.

In some embodiments, the processor 1202 may also be linked through the system interconnect 1206 to a storage device 1218 that can include a hard drive, a solid state drive (SSD), a magnetic drive, an optical drive, a portable drive, a flash drive, a Universal Serial Bus (USB) flash drive, an array of drives, and/or any other type of storage, including combinations thereof. In some embodiments, the storage device 1218 can include any suitable applications.

It is to be understood that the block diagram of FIG. 12 is not intended to indicate that the computing device 1200 is to include all of the components shown in FIG. 12. Rather, the computing device 1200 can include fewer and/or additional components not illustrated in FIG. 12 (e.g., additional memory components, embedded controllers, additional modules, additional network interfaces, etc.).

Reference in the specification to "one embodiment" or "an embodiment" or "some embodiments" of the disclosed subject matter means that a particular feature, structure, or characteristic described in connection with the embodiment is included in at least one embodiment of the disclosed subject matter. Thus, the phrase "in one embodiment" or "in some embodiments" may appear in various places throughout the specification, but the phrase may not necessarily refer to the same embodiment or embodiments.

Example 1 includes a display. The display includes a plurality of display pixels, an integrated timing controller and driver circuit to drive the display pixels, and a de-multiplexer circuit. The de-multiplexer circuit can include one or more transistors coupled to the integrated timing controller and driver circuit and coupled to one or more of the plurality of display pixels.

Example 2 includes the display of example 1, including or excluding optional features. In this example, the plurality of display pixels include one or more sub-pixels (for example, the display pixels can include red, green, and blue sub-pixels).

Example 3 includes the display of any of examples 1 or 2, including or excluding optional features. In this example, the display is a thin film transistor display (or a display with a thin film transistor backplane).

Example 4 includes the display of example 3, including or excluding optional features. In this example, the thin film transistor display is at least one of a low temperature polycrystalline silicon (LTPS) display (or a display with an LTPS backplane), an oxide display (or a display with an oxide backplane), and an amorphous silicon display (or a display with an amorphous silicon backplane).

Example 5 includes the display of any of examples 1-4, including or excluding optional features. In this example, the de-multiplexer circuit includes a single de-multiplexer transistor circuit.

Example 6 includes the display of any of examples 1-5, including or excluding optional features. In this example, the de-multiplexer circuit includes a dual de-multiplexer transistor circuit.

Example 7 includes the display of any of examples 1-6, including or excluding optional features. In this example, the de-multiplexer circuit includes an oxide de-multiplexer transistor circuit.

Example 8 includes the display of any of examples 1-7, including or excluding optional features. In this example, the integrated timing controller and driver circuit is to drive the display pixels at a fixed low frame rate.

Example 9 includes the display of example 8, including or excluding optional features. In this example, the fixed low frame rate is below 60 Hertz.

Example 10 includes the display of any of examples 1-9, including or excluding optional features. In this example, the de-multiplexer circuit includes one or more transistors that split sub-pixel data into separate data lines during one gate scan time.

Example 11 includes the display of any of examples 1-10, including or excluding optional features. In this example, the de-multiplexer circuit includes one or more transistors with two drain output nodes and one input source.

Example 12 is a computing device. The computing device includes a processor and a display. The display includes a plurality of display pixels, an integrated timing controller and driver circuit to drive the display pixels, and a de-multiplexer circuit including one or more transistors coupled to the integrated timing controller and driver circuit and coupled to one or more of the plurality of display pixels.

Example 13 includes the computing device of example 12, including or excluding optional features. In this example, the plurality of display pixels include one or more sub-pixels.

Example 14 includes the computing device of any of examples 12 or 13, including or excluding optional features. In this example, the display is a thin film transistor display (or a display with a thin film transistor backplane).

Example 15 includes the computing device of example 14, including or excluding optional features. In this example, the thin film transistor display is at least one of a low temperature polycrystalline silicon (LTPS) display (or a display with an LTPS backplane), an oxide display (or a display with an oxide backplane), and an amorphous silicon display (or a display with an amorphous silicon backplane).

Example 16 includes the computing device of any of examples 12-15, including or excluding optional features. In this example, the de-multiplexer circuit includes a single de-multiplexer transistor circuit.

Example 17 includes the computing device of any of examples 12-16, including or excluding optional features. In this example, the de-multiplexer circuit includes a dual de-multiplexer transistor circuit.

Example 18 includes the computing device of any of examples 12-17, including or excluding optional features. In this example, the de-multiplexer circuit includes an oxide de-multiplexer transistor circuit.

Example 19 includes the computing device of any of examples 12-18, including or excluding optional features. In this example, the integrated timing controller and driver circuit is to drive the display pixels at a fixed low frame rate.

Example 20 includes the computing device of example 19, including or excluding optional features. In this example, the fixed low frame rate is below 60 Hertz.

Example 21 includes the computing device of any of examples 12-20, including or excluding optional features. In this example, the de-multiplexer circuit includes one or more transistors that split sub-pixel data into separate data lines during one gate scan time.

Example 22 includes the computing device of any of examples 12-21, including or excluding optional features. In this example, the de-multiplexer circuit includes one or more transistors with two drain output nodes and one input source.

Example 23 is a display. The display includes a plurality of display pixels, an integrated timing controller and driver means to drive the display pixels, and means for de-multiplexing coupled to the integrated timing controller and driver means and coupled to one or more of the plurality of display pixels.

Example 24 includes the display of example 23, including or excluding optional features. In this example, the means for de-multiplexing includes one or more transistors coupled to the integrated timing controller and driver means and coupled to one or more of the plurality of display pixels.

Example 25 includes the display of any of examples 23 or 24, including or excluding optional features. In this example, the plurality of display pixels includes one or more sub-pixels.

Example 26 includes the display of any of examples 23-25, including or excluding optional features. In this example, the display is a thin film transistor display (or a display with a thin film transistor backplane).

Example 27 includes the display of example 26, including or excluding optional features. In this example, the thin film transistor display is at least one of a low temperature polycrystalline silicon (LTPS) display (or a display with an LTPS backplane), an oxide display (or a display with an oxide backplane), and an amorphous silicon display (or a display with an amorphous silicon backplane).

Example 28 includes the display of any of examples 23-27, including or excluding optional features. In this example, the means for de-multiplexing includes a single de-multiplexer transistor circuit.

Example 29 includes the display of any of examples 23-28, including or excluding optional features. In this example, the means for de-multiplexing includes a dual de-multiplexer transistor circuit.

Example 30 includes the display of any of examples 23-29, including or excluding optional features. In this example, the means for de-multiplexing includes an oxide de-multiplexer transistor circuit.

Example 31 includes the display of any of examples 23-30, including or excluding optional features. In this example, the integrated timing controller and driver means is to drive the display pixels at a fixed low frame rate.

Example 32 includes the display of example 31, including or excluding optional features. In this example, the fixed low frame rate is below 60 Hertz.

Example 33 includes the display of any of examples 23-32, including or excluding optional features. In this example, the means for de-multiplexing includes one or more transistors that split sub-pixel data into separate data lines during one gate scan time.

Example 34 includes the display of any of examples 23-33, including or excluding optional features. In this example, the means for de-multiplexing includes one or more transistors with two drain output nodes and one input source.

Example 35 is a computing device. A computing device includes processing means and display means. The display means includes a plurality of display pixels, an integrated timing controller and driver means for driving the display pixels, and means for de-multiplexing coupled to the integrated timing controller and driver means and coupled to one or more of the plurality of display pixels.

Example 36 includes the computing device of example 35, including or excluding optional features. In this example, the means for de-multiplexing includes one or more transistors coupled to the integrated timing controller and driver means and coupled to one or more of the plurality of display pixels.

Example 37 includes the computing device of any of examples 35 or 36, including or excluding optional features. In this example, the plurality of display pixels include one or more sub-pixels.

Example 38 includes the computing device of any of examples 35-37, including or excluding optional features. In this example, the display means is a thin film transistor display means.

Example 39 includes the computing device of example 38, including or excluding optional features. In this example, the thin film transistor display means is at least one of a low temperature polycrystalline silicon display means, an oxide display means, and an amorphous silicon display means.

Example 40 includes the computing device of any of examples 35-39, including or excluding optional features. In this example, the means for de-multiplexing includes a single de-multiplexer transistor circuit.

Example 41 includes the computing device of any of examples 35-40, including or excluding optional features. In this example, the means for de-multiplexing includes a dual de-multiplexer transistor circuit.

Example 42 includes the computing device of any of examples 35-41, including or excluding optional features. In this example, the means for de-multiplexing includes an oxide de-multiplexer transistor circuit.

Example 43 includes the computing device of any of examples 35-42, including or excluding optional features. In this example, the integrated timing controller and driver means is to drive the display pixels at a fixed low frame rate.

Example 44 includes the computing device of example 43, including or excluding optional features. In this example, the fixed low frame rate is below 60 Hertz.

Example 45 includes the computing device of any of examples 35-44, including or excluding optional features. In this example, the means for de-multiplexing includes one or more transistors that split sub-pixel data into separate data lines during one gate scan time.

Example 46 includes the computing device of any of examples 35-45, including or excluding optional features. In this example, the means for de-multiplexing includes one or more transistors with two drain output nodes and one input source.

Although example embodiments of the disclosed subject matter are described with reference to circuit diagrams, flow diagrams, block diagrams etc. in the drawings, persons of ordinary skill in the art will readily appreciate that many other ways of implementing the disclosed subject matter may alternatively be used. For example, the arrangements of the elements in the diagrams, and/or the order of execution of the blocks in the diagrams may be changed, and/or some of the circuit elements in circuit diagrams, and blocks in block/flow diagrams described may be changed, eliminated, or combined. Any elements as illustrated and/or described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, one or more volatile and/or non-volatile memory devices, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine-readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter. For example, in each illustrated embodiment and each described embodiment, it is to be understood that the diagrams of the figures and the description herein is not intended to indicate that the illustrated or described devices include all of the components shown in a particular figure or described in reference to a particular figure. In addition, each element may be implemented with logic, wherein the logic, as referred to herein, can include any suitable hardware (e.g., a processor, among others), software (e.g., an application, among others), firmware, or any suitable combination of hardware, software, and firmware, for example.

What is claimed is:

1. A display comprising:

a plurality of display pixels;

timing controller circuitry;

driver circuitry on a same integrated circuit as the timing controller circuitry, the driver circuitry to drive the display pixels; and de-multiplexer circuitry to de-multiplex pixel data to send to the plurality of display pixels, the de-multiplexer circuitry including first and second transistors corresponding to a subpixel data line, a first gate of the first transistor connected to a second gate of the second transistor, drains of the first and second transistors connected to the subpixel data line.

2. The display of claim 1, wherein the integrated circuit is a thin film transistor backplane to include the driver circuitry and the timing controller circuitry.

3. The display of claim 1, wherein the driver circuitry is to drive the display pixels on at least one of a low temperature polycrystalline silicon display, an oxide display, or an amorphous silicon display.

4. The display of claim 1, wherein the driver circuitry is to drive the display pixels at a fixed low frame rate, the fixed low frame rate set to 30 Hertz, 40 Hertz, or 60 Hertz.

5. The display of claim 1, wherein the plurality of display pixels includes sub-pixels, the sub-pixels including at least one of a red sub-pixel, a blue sub-pixel, or a green sub-pixel.

6. The display of claim 1, wherein the first and second transistors are connected to form one input source.

7. The display of claim 1, wherein sources of the first and second transistors are connected to the driver circuitry.

8. An apparatus comprising:

driver circuitry on a same integrated circuit as timing controller circuitry, the driver circuitry to drive a plurality of display pixels; and de-multiplexer circuitry to de-multiplex pixel data to send to the plurality of display pixels, the de-multiplexer circuitry including first and second transistors corresponding to a subpixel data line, a first gate of the first transistor connected to a second gate of the second transistor, drains of the first and second transistors connected to the subpixel data line.

9. The apparatus of claim 8, wherein the driver circuitry is to drive the display pixels on a thin film transistor backplane.

10. The apparatus of claim 8, wherein the driver circuitry is to drive the display pixels on at least one of a low temperature polycrystalline silicon display, an oxide display, or an amorphous silicon display.

11. The apparatus of claim 8, wherein the driver circuitry is to drive the display pixels at a fixed low frame rate below 60 Hertz.

12. The apparatus of claim 8, wherein the driver circuitry is to drive the display pixels by driving sub-pixels including at least one of a red sub-pixel, a blue sub-pixel, or a green sub-pixel.

13. The apparatus of claim 8, wherein the first and second transistors are connected to form one input source.

14. The apparatus of claim 8, wherein sources of the first and second transistors are connected to the driver circuitry.

15. A method comprising:

driving a plurality of display pixels using driver circuitry on a same integrated circuit as timing controller circuitry; and de-multiplexing, via de-multiplexer circuitry, pixel data to send to the plurality of display pixels, the de-multiplexer circuitry including first and second transistors corresponding to a subpixel data line, a first gate of the first transistor connected to a second gate of the second transistor, drains of the first and second transistors connected to the subpixel data line.

16. The method of claim 15, wherein the driving of the plurality of display pixels includes driving the display pixels on a thin film transistor backplane that includes the driver circuitry and the timing controller circuitry.

17. The method of claim 15, wherein the driving of the plurality of display pixels includes driving at least one of a low temperature polycrystalline silicon display, an oxide display, or an amorphous silicon display.

18. The method of claim 15, wherein the driving of the plurality of display pixels includes driving the plurality of display pixels at a fixed low frame rate less than 60 Hertz.

19. The method of claim 15, wherein the driving of the plurality of display pixels includes driving sub-pixels, the sub-pixels including at least one of a red sub-pixel, a blue sub-pixel, or a green sub-pixel.

20. The method of claim 15, wherein the de-multiplexing of the pixel data includes splitting sub-pixel data into sub-pixel data lines during one gate scan time.

21. An integrated circuit comprising:

timing controller embedded driver circuitry to drive display pixels in a low temperature polycrystalline silicone (LTPS) thin-film transistor (TFT) panel; and de-multiplexer circuitry to de-multiplex pixel data to send to the display pixels, the de-multiplexer circuitry including dual transistor structures.

22. The integrated circuit of claim 21, wherein the timing controller embedded driver circuitry is an integrated timing controller embedded driver circuitry on a same integrated circuit.

23. The integrated circuit of claim 21, wherein the de-multiplexer circuitry includes the dual transistor structures per subpixel data line.

24. The integrated circuit of claim 23, wherein the sub-pixel data line is coupled to a red subpixel, the red subpixel in a group including a green subpixel and a blue subpixel.

25. The integrated circuit of claim 21, wherein the de-multiplexer circuitry is in a display panel.

* * * * *